United States Patent [19]

Storti et al.

[11] Patent Number: 4,570,198
[45] Date of Patent: Feb. 11, 1986

[54] LOW VOLTAGE ALTERNATOR HAVING SHORT CIRCUIT PROTECTION

[75] Inventors: Sandro Storti, Sesto San Giovanni; Pietro Menniti, Badolato, both of Italy

[73] Assignee: SGS-ATES Componenti Elettronici S.p.A., Catania, Italy

[21] Appl. No.: 515,960

[22] Filed: Jul. 21, 1983

[30] Foreign Application Priority Data

Aug. 4, 1982 [IT] Italy ................ 22732 A/82

[51] Int. Cl.⁴ ............................................. H02H 7/06
[52] U.S. Cl. ........................................ 361/20; 361/18; 361/94; 361/98; 322/24; 322/27; 322/68
[58] Field of Search ............... 361/18, 20, 21, 98, 361/94; 323/311, 312; 322/27, 23, 24, 68

[56] References Cited

U.S. PATENT DOCUMENTS

| | | | |
|---|---|---|---|
| 3,426,265 | 2/1969 | Till | 361/18 X |
| 3,432,726 | 3/1969 | Meyer et al. | 361/18 X |
| 3,527,997 | 9/1970 | Nercessian | 361/18 X |
| 3,753,079 | 8/1973 | Trilling | 361/18 X |
| 3,796,943 | 3/1974 | Nelson et al. | 361/18 X |
| 3,940,572 | 2/1976 | Burgess | 361/18 X |
| 3,983,471 | 9/1976 | Itoh et al. | 361/18 X |
| 4,013,925 | 3/1977 | Tice et al. | 361/18 |
| 4,306,184 | 12/1981 | Iwaki et al. | 361/20 X |
| 4,338,646 | 7/1982 | Davis et al. | 361/18 |
| 4,401,937 | 8/1983 | Morishita | 361/18 X |

Primary Examiner—Patrick R. Salce
Attorney, Agent, or Firm—Cushman, Darby & Cushman

[57] ABSTRACT

In case of short circuit the overcurrent which passes through a detecting resistance in series with the excitation winding of the alternator operates a threshold current generator, which reduces the voltage of the central node of a voltage divider. A trigger interposed between said central node and an actuator circuit (for example a Darlington circuit) placed in series with the excitation winding of the alternator and with the above mentioned resistance turns off said actuator circuit, thus interrupting the current passage through the excitation winding. A filtering condenser associated to the voltage divider restores with delay the initial condition. The cycle is periodically repeated until the short circuit condition remains.

3 Claims, 1 Drawing Figure

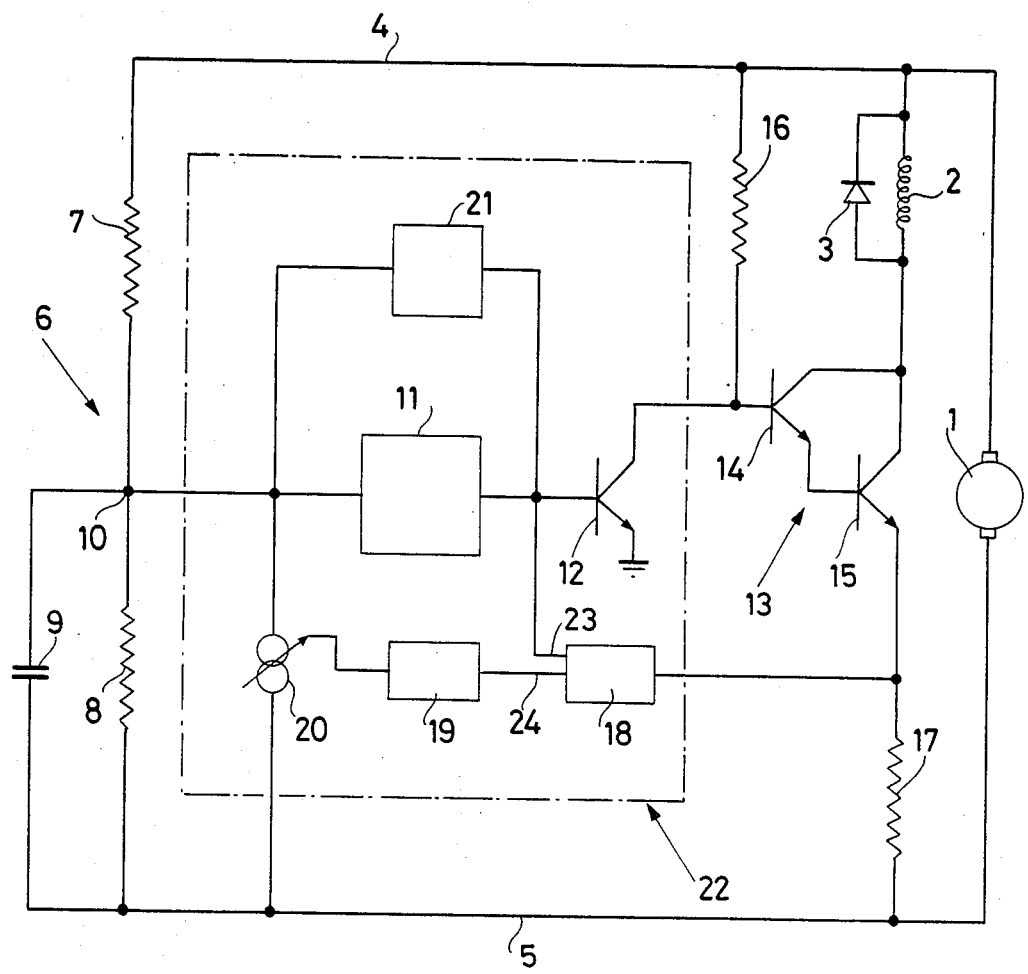

LOW VOLTAGE ALTERNATOR HAVING SHORT CIRCUIT PROTECTION

The present invention relates to a protection circuit against the short circuit of the excitation winding for low voltage alternator provided with voltage regulator, particularly for car-use.

It is known that the modern car technology provides for the use of low voltage alternators, to which there are associated suitable voltage regulators, which operate on the feed current of the excitation winding of the alternator.

Particularly it often happens that the voltage regulator is constituted by an integrated circuit included in the feed circuit of the excitation winding of the alternator between an input voltage divider provided with filtering condenser and an actuator circuit (for example of Darlington kind) situated in series with said excitation winding.

There is also usually provided a protection against the short circuits of the excitation winding, which is based on systems which interrupt the supply to the above mentioned circuit when there is no voltage at the ends of the alternator rotor.

The presently used protection systems have however the disadvantage to be founded on the detection of the output voltage of the alternator, with the result of having high response times, of being subjected to wrong interventions and of being linked to the particular circuitry provided at the alternator output.

The object of the present invention is to realize a protection circuit, which is of ready and sure response and easily suitable for circuits of present use.

According to the invention such an object is reached by means of a protection circuit against the short circuit of the excitation winding for low voltage alternator provided with a voltage regulator, particularly for car-use, said regulator being inserted between an input voltage divider provided with a filtering condenser and an actuator circuit placed in series with said excitation winding, characterized in that it comprises a detecting resistance connected in series with said excitation winding and with said actuator circuit, a threshold voltage generator placed in parallel with said filtering condenser and controlled by the voltage at the ends of said detecting resistance and a trigger circuit placed in parallel with said regulator between said voltage divider and said actuator circuit in order to control a brief cut-off of said actuator circuit every time said generator is operated by an overvoltage produced at the ends of said detecting resistance by a short circuit overcurrent.

In other words, the protection circuit according to the invention is based on the concept of detecting no longer the output voltage of the alternator (as in the above mentioned known circuits), but the same overcurrent which passes through the excitation winding of the alternator in case of short circuit. The reply is consequently immediate and surely free from wrong detections owing to working defects of the alternator. Besides it is used a very simple circuit assembly, which is practically put in parallel with the voltage regulator, on the other hand making use of the already existing circuit elements. Leaving inalterated the rest of the circuit (detecting residence excluded), this allows the protection circuit to be incorporated in the same integrated circuit of the voltage regulator, with evident structural and economic advantages. At that moment it results a monolithic component, which is not linked to the particular output circuitry of the alternator and therefore can be associated to any alternator whichever is its use.

The characteristics and the advantages of the present invention will be made evident by the following detailed description of an embodiment illustrated by way of example in the enclosed drawing.

With reference to the drawing, there is represented the circuit diagram of a regulation circuit for alternator, which includes a voltage regulator and a protection circuit according to the invention.

In the drawing the alternator is indicated with the reference number 1, while its excitation winding is indicated with 2 and the diode in parallel with it with 3. With the reference numbers 4 and 5 there are respectively indicated the feeding and the mass conductors.

Between the above mentioned conductors 4 and 5 there is inserted a voltage divider 6, which includes two serially connected resistances 7 and 8 and filtering condenser 9 placed in parallel with the resistance 8.

To the central node 10 of the divider 6 there is connected the regulation input of a voltage regulator 11 (of any known kind and consequently not described and illustrated in details), which by means of a transistor 12 acts on an actuator circuit 13 placed in parallel with the excitation winding 2 and constituted by two transistors 14 and 15 in Darlington connection. A resistance 16 provides for the bias of such circuit.

It is also provided with a protection circuit against the short circuit of the excitation winding, which comprises a detecting resistance 17, a detector and current limiter circuit 18, a delay circuit 19, a threshold current generator 20 and a trigger circuit 21. The detecting resistance 17 is connected in series with the excitation winding 2 and with the Darlington circuit 13, so as to be passed through by possible short circuit overcurrents and to create in such case corresponding overvoltages detected by the detector 18. This latter has an output 23 connected to the base of the transistor 12 and another output 24 connected through the delay circuit 19 to the control device of the threshold current generator 20, which in its turn is connected in parallel with the resistance 8 of the divider 6, as well as with the filtering condenser 9. The trigger 21 is finally connected in parallel with the voltage regulator 11 between the central node 10 of the divider 6 and the base of the transistor 12.

The whole assembly constituted by the voltage regulator 11, by the transistor 12 and by the several components of the protection circuit (except for the detecting resistance 17) is finally included in a single monolithic integrated circuit, which is indicated in the drawing by the reference number 22. Alternatively, there can alslo be included in the same monolithic integrated circuit the resistive divider 6, the actuator 13, the bias resistance 16, the detecting resistance 17 and the diode 3 (or only a part of them).

During the working, the voltage regulator 11 acts on the Darlington circuit 13 in order to adjust the feed current of the excitation winding 2 at a predetermined value, to which a preselected voltage delivered by the alternator 1 corresponds.

In case of short circuit of the excitation winding, this latter is obviously passed through by an overcurrent, which also passes through the Darlington circuit 13 and the detecting resistance 17. At the ends of this latter there is then created a corresponding overvoltage, which is detected by the detector 18. A double protection, so called "linear" and "switching", becomes operating.

The "linear" one consists in the fact that by means of the output 23 the detector 18 limits the Darlington current at a chosen value.

The "switching" one (or "with periodical alternation") in its turn consists in the fact that with a delay fixed by the delay circuit 19 (in order to avoid wrong alarms by overcurrents of short time) the output 24 of the detector 18 controls the operating of the threshold generator 20 which, by reducing the voltage at the node 10 of the divider 6 under a lower prefixed threshold, causes the switching of the trigger 21 to such a condition so as to cause the cut-off of the Darlington circuit 13 and the consequent interruption of the short circuit current. At that moment the voltage at the ends of the resistance 17 naturally falls to zero, so that the generator 20 stops to supply current and the condenser 9 (previously discharged) can recharge through the divider 6 until to bring again the node 10, after a certain time, to the upper threshold of the trigger 21. This latter then turns again to conduction the Darlington circuit 13, which restores the passage of current through the excitation winding 2 and the detecting resistance 17. The described cycle is then repeated at a fixed frequence until the overcurrent condition remains.

We claim:

1. An overload protection circuit for the excitation winding of a low voltage alternate or having a voltage regulator, said protection circuit including an input voltage divider having a filtering condenser and an actuator circuit placed in series with said excitation winding, the regulator being inserted between said divider and actuator circuit, the protection circuit further comprising a detecting resistor connected in series with said excitation winding and said actuator circuit, a threshold voltage generator placed in parallel with said filtering condenser and controlled by the voltage at the ends of said detecting resistance and a trigger circuit placed in parallel with said regulator between said voltage divider and said actuator circuit in order to control a brief cut-off of said actuator circuit when said generator is effected by an overvoltage produced at the ends of said detecting resistor.

2. Protection circuit according to claim 1, characterized in that said detecting resistor and said current threshold generator are operatively connected by means of a series of a detector circuit and of a delay circuit.

3. Protection circuit according to claim 2, characterized in that an output of said detector circuit acts on said actuator circuit in order to limit the value of the short circuit overcurrent.

* * * * *